UNITED STATES PATENT OFFICE.

JOHANN SCHICHT, OF AUSSEGG-ON-THE-ELBE, AUSTRIA-HUNGARY.

PROCESS OF MANUFACTURING SOAP.

SPECIFICATION forming part of Letters Patent No. 509,049, dated November 21, 1893.

Application filed January 18, 1893. Serial No. 458,829. (No specimens.) Patented in Austria-Hungary October 10, 1892, No. 26,242 and No. 48,082.

*To all whom it may concern:*

Be it known that I, JOHANN SCHICHT, residing at Aussegg-on-the-Elbe, Austria-Hungary, have invented certain new and useful Improvements in Processes of Manufacturing Hard Potash Soap, (for which I have obtained a patent in Austria-Hungary, No. 26,242 and No. 48,082, dated October 10, 1892;) of which the following is a specification.

My invention relates to the manufacture of soap.

For making hard potash soap and potash-soda-soap it is necessary to use a very concentrated caustic alkali and to saponify the latter with the fat at as high a temperature as practicable. Up to the present time this saponification has been effected by causing the concentrated caustic potash or a mixture of potash and soda to flow into the strongly heated fat. This however presents the inconvenience that the fat, owing to the high temperature to which it has to be heated in order to obtain a hard product, becomes brown and attacks by the free fatty acid, which is either produced in consequence of the great heat necessary, or exists already in the fat, the sides of the boiler consisting mostly of copper or iron, with formation of sebates. Accordingly this method of causing the caustic potash or mixture of potash and soda to flow into the heated fat, gives rise to two inconveniences, that is to say, the finished soap, by reason of the fat becoming brown, obtains a comparatively dark color; and it is polluted by the sebacic metallic oxides (green copper sebate or rust-brown iron sebate) which in the use of the soap gives rise to an insoluble residue often coloring even the articles to be washed, particularly clothing. In order to obviate these inconveniences I modify the customary method of manufacturing hard potash and potash-soda soap in such a manner that the concentrated caustic alkali is not caused to flow into the highly heated fat, but that a thin jet of the fat is caused to pass into the highly heated caustic alkali while the material is rapidly stirred. Prior to being poured into the liquor the fat is heated to a temperature below that at which the browning begins and as at the instant when the fat meets with the large excess of the caustic alkali the saponification takes place, the browning cannot occur subsequently, because the finished soap can be subjected to a much higher temperature than the fat without undergoing deleterious changes. Moreover, by the flow of the fat into the caustic alkali and by the direct saponification of the fat, a contact of the fatty acids, which may be contained in the fat or formed during the application of the heat, with the metallic sides of the boiler is entirely obviated so that the formation of copper sebate or iron sebate and the consequent pollution of the soap will be prevented.

In practice my above described method may be carried out in the following manner: Concentrated caustic alkali, of about 45° Baumé or over, is heated in the soap boiler to about 135° centigrade or weak liquor is evaporated until it reaches this boiling point. At the same time the fat is heated in a separate vessel to from about 80° to 100° centigrade and introduced in thin jets into the caustic alkali. By means of mechanical stirrers the entire material in the soap boiler is kept in continual motion, thereby effecting an immediate and intimate mixing of the fat as it flows in with the alkaline liquor.

What I claim is—

The method of making hard potash and potash soda soap, which consists in heating concentrated caustic alkali of about 45° Baumé in the soap boiler to a temperature of about 135° centigrade, heating the fat in a separate vessel to a temperature of about 100° centigrade, and then introducing the hot fat into the hot alkali in the form of fine jets and agitating the mixture, substantially as set forth.

In witness whereof I have hereunto set my hand in presence of two witnesses.

JOHANN SCHICHT.

Witnesses:
 ADUBOIS REYMOND,
 LUDWIG KÖNIG.